(12) United States Patent
Dote

(10) Patent No.: US 6,614,755 B1
(45) Date of Patent: Sep. 2, 2003

(54) METHOD FOR CONTROLLING CONGESTION FROM A TERMINAL IN A FRAME RELAY NETWORK

(75) Inventor: Shinzo Dote, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/209,428

(22) Filed: Dec. 11, 1998

(30) Foreign Application Priority Data

Dec. 15, 1997 (JP) .............................................. 9-363107

(51) Int. Cl.[7] ................................................ H04J 1/16
(52) U.S. Cl. ........................ 370/230; 370/235; 370/391
(58) Field of Search ................................. 370/229, 230, 370/231, 235, 236, 236.2, 391

(56) References Cited

U.S. PATENT DOCUMENTS

| | | | | |
|---|---|---|---|---|
| 5,400,329 A | * | 3/1995 | Tokura et al. ............... | 370/232 |
| 5,426,635 A | * | 6/1995 | Mitra et al. .................. | 370/229 |
| 5,594,729 A | * | 1/1997 | Kanakia et al. ............. | 370/391 |
| 5,600,798 A | * | 2/1997 | Cherukuri et al. .......... | 370/230 |
| 5,719,853 A | * | 2/1998 | Ikeda .......................... | 370/229 |
| 5,777,984 A | * | 7/1998 | Gun et al. ................... | 370/230 |
| 5,970,048 A | * | 10/1999 | Pajuvirta et al. ............ | 370/230 |
| 6,094,418 A | * | 7/2000 | Soumiya et al. ............ | 370/231 |
| 6,144,636 A | * | 11/2000 | Aimoto et al. .............. | 370/229 |

FOREIGN PATENT DOCUMENTS

| | | |
|---|---|---|
| JP | 04-249448 | 9/1992 |
| JP | 08-149156 | 6/1996 |

OTHER PUBLICATIONS

Nomura, Masayuki, "Frame Relay Applications", Rick Telecom Co., Ltd., Apr. 30, 1994, pp. 13–16 and 76–82.

* cited by examiner

Primary Examiner—Hassan Kizou
Assistant Examiner—David E Odland
(74) Attorney, Agent, or Firm—Sughrue Mion, PLLC

(57) ABSTRACT

The method for controlling congestion from a terminal in a frame relay network, according to the present invention, comprises the steps of: detecting congestion in the network by receiving a congestion notification frame with a BECN bit=1; reducing a transmission window size based on the ratio of the congestion notification frames with the BECN bits=1 to received frames; enlarging the transmission window size, when the congestion subsides and frames with the BECN=0 in the received frames increase; and stopping the enlargement of the transmission window size when the transmission window size attains the maximum transmission window size.

10 Claims, 2 Drawing Sheets

METHOD FOR CONTROLLING CONGESTION FROM A TERMINAL IN A FRAME RELAY NETWORK

FIELD OF THE INVENTION

The present invention relates to a method for controlling congestion from a terminal in a frame relay network, and in particular, to a method for controlling congestion from a frame relay terminal (hereinafter referred as a terminal) connected to a digital network providing a frame relay bearer service, which is called a frame relay network (hereinafter referred as a "network"). The terminal may be a terminal device such as a terminal adapter, a communication control device, and a communication protocol conversion device.

This application is based on Japanese Patent Application No. Hei 9-363107, the contents of which are incorporated herein by reference.

BACKGROUND ART

In congestion control on a frame relay network, when the network becomes congested, a congestion notification is sent to a terminal, which then restricts data traffic (ITU-T recommendation: Q.922 ISDN data link layer specification for frame mode bearer service).

In one conventional method for providing congestion control in the frame relay network, discarding of data caused by the congestion is avoided to enhance network throughput (Japanese Patent Application, First Publication No. Hei 8-149156), and, in another conventional method, a frame relay communication processing device executes an interrupt to alleviate the congestion (Japanese Patent Application, First Publication No. Hei 8-85337).

In general, there are three types of method for explicitly sending a congestion notification through a network to a terminal:

1) setting to 1 a forward explicit congestion notification (FECN) bit, which is included in a frame transmitted to the terminal,
2) setting to 1 a backward explicit congestion notification (BECN) bit, which is included in a frame transmitted to the terminal, and
3) voluntarily transmitting a consolidated link layer management (CLLM) message to the terminal.

There are two types of method for controlling congestion from the terminal which receives the notification explicitly indicating the congestion in the network:

a) a throughput control method for controlling a quantity of transmitted data during a certain period of time (throughput), and
b) a window control method for altering a transmission window size WS which represents the number of frames transmittable without requesting acknowledgement of receipt from the terminal.

The two congestion control methods are intended to restrict the quantity of transmitted data when the network becomes congested and to restore the quantity of transmitted data after the congestion subsides.

With reference to FIG. 2, the basic steps of the conventional window control method will be explained from the occurrence of the congestion during data transmission from the terminal to the restoring the normal quantity of transmitted data to the normal level after the subsidence of the network congestion.

Before the occurrence of the congestion, the terminal transmits data while maintaining a transmission window size WS at the maximum window size MW (for example, 32) (in step P201). When the network becomes congested (in step P202), the terminal recognizes the congestion by the congestion notification transmitted through the network (in step P203). The terminal, after the recognition of the congestion, reduces the quantity of transmitted data to decrease a load to the network. The reduction is executed by, for example, the following window control process for reducing the transmission window size WS (in step P204).

In case of the congestion notification using a BECN bit, on receipt of a frame with the BECN bit set to 1 (congestion notification frame), the terminal alters the transmission window size WS according to WS=present WS×0.675 (where WS≧1). Further, when the stepcount S number of consecutive frames are received with the BECN bits set to 1, the alteration is repeated. The stepcount S indicates the number of frames to be received within twice the length of time of a frame transmission delay from one terminal to another terminal under the maximum throughput.

When the subsidence of the congestion is detected (in step P205), the terminal detects the subsidence by receiving no congestion notification frame (in step P206). On receipt of the congestion subsidence notification through the network, the terminal restores the quantity of the transmitted data to normal. The transmission window size WS is enlarged (in step 207) to the initial maximum transmission window size MW (in step P208) by, for example, the following process.

On receipt of S/2 (half of the stepcount S) consecutive frames with the BECN bits=0, the terminal alters the transmission window size WS according to WS=present WS+1.

In the above-mentioned conventional window control method based on the congestion notification using the BECN bit, when there are few frames traveling in the direction opposite to the congestion, there is a problem in that the terminal cannot sufficiently implement the flow control. For example, when the stepcount S is 100 and there are two frames per second traveling in the direction opposite to the congestion, it takes 50 seconds from the reduction of the transmission window size WS on receipt of the first BECN bit set to 1 until the next reduction of the transmission window size WS. This applies to the avoidance of the congestion, under which it takes 25 seconds to enlarge the transmission window size WS to the next step size. Thus, even though congestion may occur, the transmission window size WS is not reduced immediately, and neither the transmission window size WS is increased immediately after the congestion subsides, resulting in inefficient throughput.

SUMMARY OF THE INVENTION

It is therefore an object of the present invention to provide a method for controlling congestion from a terminal in a frame relay network, which can provide efficient window control according to the status of a network irrespective of a quantity of frames traveling in the direction opposite to the congestion.

In order to accomplish the above object, a method for controlling congestion from a terminal in a frame relay network, according to the present invention comprises the step of reducing and increasing a quantity of transmitted data, eliminating the influence of the quantity of data transmitted through the frame relay network. In one aspect of the present invention, a transmission window size is reduced based on a ratio of frames with BECN (backward explicit congestion notification) bits set to frames received in a certain period of time.

In another aspect of the present invention, a method for controlling congestion from a terminal in a frame relay network, comprises the steps of: detecting congestion in the network by receiving a congestion notification frame with a BECN bit=1; reducing a transmission window size based on the ratio of the congestion notification frames with the BECN bits=1 to received frames; enlarging the transmission window size, when the congestion subsides and frames with the BECN=0 in the received frames increase; and stopping the enlargement of the transmission window size when the transmission window size attains the maximum transmission window size.

In another aspect of the present invention, a method for controlling congestion from a terminal in a frame relay network, comprises the steps of: detecting congestion in the network by receiving a congestion notification frame with a BECN bit=1; reducing a transmission window size on receipt of the first congestion notification frame; starting a timer; resetting a frame number counter and a congestion notification frame number counter; determining whether a measurement interval has passed since starting the timer; determining whether a frame is received when the measurement interval has not passed; increasing the frame number counter incrementally when the frame is received; determining whether the BECN bit of the received frame is set to 1; increasing the congestion notification frame number counter incrementally when the BECN bit is set to 1; calculating a ratio by dividing the congestion notification frame number counter by the frame number counter when the measurement interval has passed; determining whether the ratio is positive; reducing the transmission window size based on the ratio when the ratio is positive; determining whether the transmission window size is set to the maximum transmission window size when the ratio is not positive; and enlarging the transmission window size when the transmission window size is not set to the maximum transmission window size.

In the step of reducing a transmission window size on receipt of the first congestion notification frame, the transmission window size WS is altered according to according to WS=present WS×0.675 (where WS≧1). In the step of determining whether a measurement interval has passed since starting the timer, the measurement interval is set to twice a length of time from arrival of a normal frame at a remote terminal to reception of a response by a local terminal. In the step of reducing the transmission window size based on the ratio when the ratio is positive, the size is reduced to 0.5 of the present size when the ratio is equal to or more than 0.9, the size is reduced to 0.7 of the present size when the ratio R is under 0.9 and equal to or more than 0.6, the size is reduced to 0.8 of the present size when the ratio R is under 0.6 and equal to or more than 0.3, and the size is reduced to 0.9 of the present size when the ratio R is under 0.3 and more than zero. In the step of determining whether the transmission window size is set to the maximum transmission window size when the ratio is not positive, the maximum transmission window size is set to 32.

In a computer readable medium containing program instructions for controlling congestion from a terminal in a frame relay network, according to the present invention, the program instructions include instructions for performing the step comprising reducing and increasing a quantity of transmitted data, eliminating the influence of the quantity of data transmitted through the frame relay network. The program instructions include instructions for performing the step comprising altering a transmission window size based on a ratio of frames with BECN (backward explicit congestion notification) bits set to frames received in a certain period of time.

In another aspect of a computer readable medium containing program instructions for controlling congestion from a terminal in a frame relay network according to the present invention, the program instructions include instructions for performing the steps comprising: detecting congestion in the network by receiving a congestion notification frame with a BECN bit=1; reducing a transmission window size based on the ratio of the congestion notification frames with the BECN bits=1 to received frames; enlarging the transmission window size, when the congestion subsides and frames with the BECN=0 in the received frames increase; and stopping the enlargement of the transmission window size when the transmission window size attains the maximum transmission window size.

The advantage of the present invention is that the transmission window size can be reduced immediately when the network becomes congested. According to the present invention, the transmission window size can be reduced in accordance with the ratio of the frames with congestion notifications to the total of frames transmitted through the network, thereby enhancing congestion control efficiency.

The second advantage of the present invention is that the quantity of the transmitted data can be increased immediately after the congestion subsides. According to the present invention, the quantity of the transmitted data is increased when no frame with the congestion notification is received during the measurement interval, thereby enhancing data transfer efficiency.

DETAILED DESCRIPTION OF THE PREFERRED EMBODIMENTS

An embodiment of the present invention will be explained with reference to figures.

Figure 1:
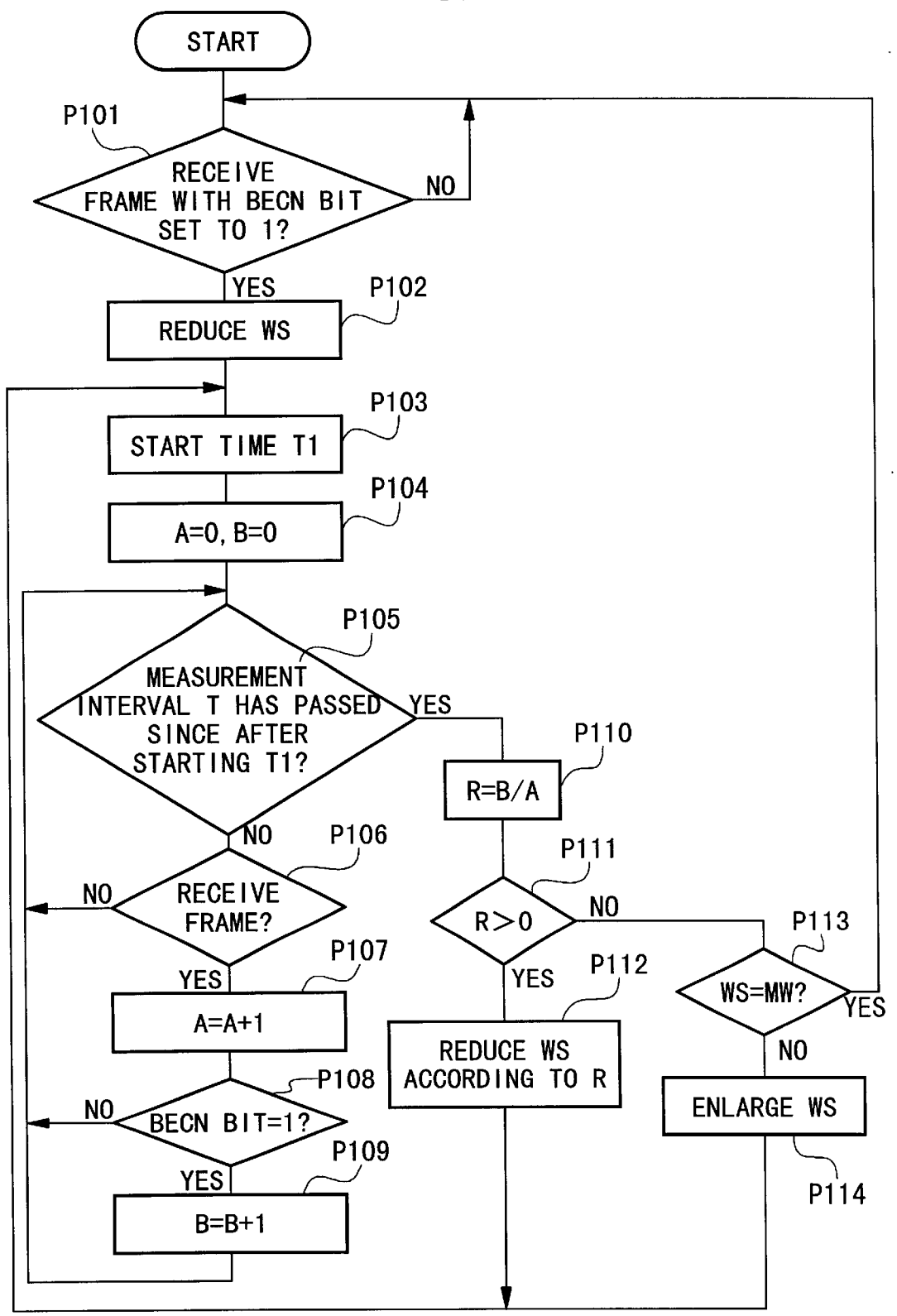
FIG. 1 is a flow chart showing a method for controlling congestion from a terminal in a frame relay network according to an embodiment of the present invention.
Figure 2:
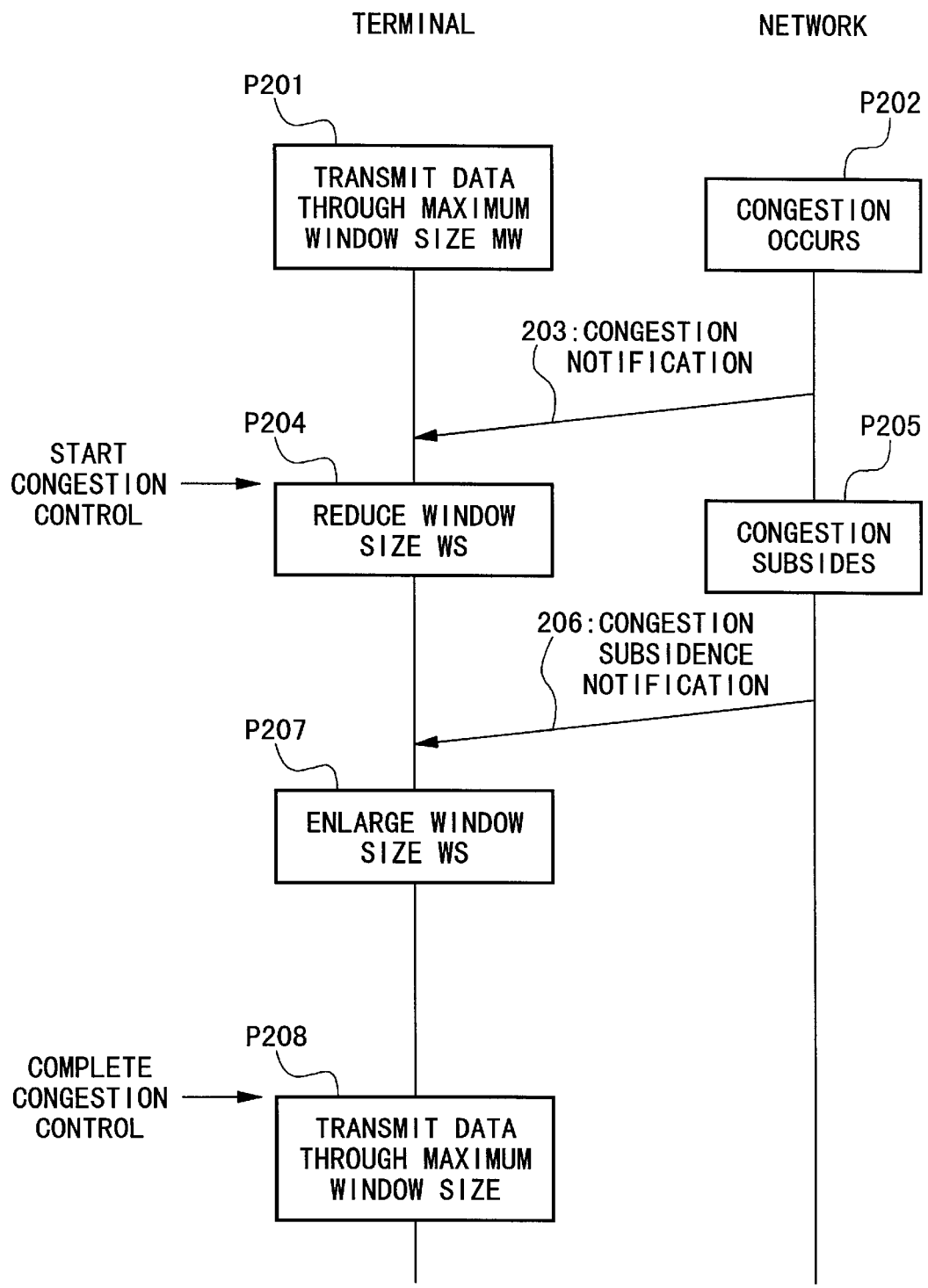
FIG. 2 is a flow chart showing a basic procedure of a conventional method for altering a transmission window size to control congestion.

FIG. 1 shows a flow chart showing a procedure of a method for controlling congestion from a terminal on a frame relay network. The method for controlling congestion from a terminal on a frame relay network in the embodiment comprises: step P101 of detecting congestion in the network by receiving a congestion notification frame with a BECN bit=1; step P102 of reducing a transmission window size on receipt of the first congestion notification frame; step P103 of starting a timer; step P104 of resetting a frame number counter and a congestion notification frame number counter; step P105 of determining whether a measurement interval has passed since starting the timer; step P106 determining whether a frame is received when the measurement interval has not passed; step P107 of increasing the frame number counter incrementally when the frame is received; step P108 of determining whether the BECN bit of the received frame is set to 1; step P109 of increasing the congestion notification frame number counter incrementally when the BECN bit is set to 1; step P110 of calculating a ratio by dividing the congestion notification frame number counter by the frame number counter when the measurement interval has passed; step P111 of determining whether the ratio is positive; step P112 of reducing the transmission window size based on the ratio when the ratio is positive; step P113 of determining whether the transmission window size is set to the maximum transmission window size when the ratio is not positive; and step P114 of enlarging the transmission window size when the transmission window size is not set to the maximum transmission window size.

The procedure for controlling congestion from the terminal on the frame relay network will be explained in more detail.

By detecting a congestion notification frame with a BECN bit set to 1, the terminal recognizes that the network has become congested (in step P101). The terminal starts to control the congestion on receipt of the congestion notification frame.

When the first congestion notification is received, the transmission window size WS is reduced (in step P102). For example, the transmission window size WS is altered according to WS=present WS×0.675 (where WS≧1).

Subsequently, a timer T1 is started (in step P103). A frame number counter A is reset to zero and a congestion notification frame number counter B is reset to zero (in step P104).

It is determined whether or not a measurement interval T has passed since the timer T1 is started (in step P105). The measurement interval T is set to, for example, twice the length of time from receipt of a normal frame by a remote terminal to receipt of a response by the local terminal.

When the measurement interval has not passed in step P105, it is determined whether or not a frame is received (in step P106). When the frame is not received, the flow returns to step P105.

When the frame is received, the frame number counter A is increased incrementally by one (in step P107), and it is determined whether the BECN bit of the received frame is set to 1 (in step P108). When the BECN bit is set to 1, the congestion notification frame number counter B is increased incrementally by one (in step P109), and the flow returns to step P105. When the BECN bit is not set to 1, the flow immediately returns to step P105.

Step P105 or P109 has been repeated. When the measurement interval T has passed, the congestion notification frame number counter B is divided by the frame number counter A to obtain a ratio R (in step P110).

It is determined whether the ratio R is positive (above zero) (in step P111), and when it is positive, the transmission window size WS is reduced (in step P112). For example, the transmission window size WS is reduced in a manner such that the size is reduced to 0.5 of the current size when the ratio R is equal to or more than 0.9, to 0.7 of the present size when the ratio R is under 0.9 and equal to or more than 0.6, to 0.8 of the present size when the ratio R is under 0.6 and equal to or more than 0.3, and to 0.9 of the present size when the ratio R is under 0.3 and more than zero. The flow thereafter returns to step P103.

When the ratio R is not positive (that is, zero) in step P111, this indicates that no congestion notification frame with the BECN bit set to one is transmitted in the measurement interval, that is, the congestion of the network subsides. Then, it is determined whether or not the transmission window size WS is set to the maximum transmission window size MW (in step P113). The maximum transmission window size MW is set to, for example, 32.

When the transmission window size WS is not set to the maximum transmission window size MW, the transmission window size WS is enlarged (in step P114). For example, the transmission window size WS is set according to WS=present WS×1.3 (where WS≦MW). The flow thereafter returns to step P103, and steps after P103 are repeated. In step P113, when the transmission window size WS is set to the maximum transmission window size MW, the flow immediately returns to step P101.

The advantage of the present invention is that the transmission window size can be reduced immediately when the network becomes congested. While in the conventional art the transmission window size is reduced under the condition that a certain number of frames with congestion notifications are received regardless of the quantity of the frames transmitted from the congested network to the local terminal, according to the present invention the transmission window size can be reduced in accordance with the ratio of the frames with congestion notifications to the total of frames transmitted through the network, thereby enhancing congestion control efficiency.

The second advantage of the present invention is that the quantity of the transmitted data can be increased immediately after the congestion subsides. While in the conventional art the quantity of transmitted data cannot be efficiently increased when there are few frames traveling to the local terminal through the network, according to the present invention the quantity of the transmitted data is increased when no frame with the congestion notification is received during the measurement interval, thereby enhancing data transfer efficiency.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A method for controlling congestion from a terminal in a frame relay network, comprising the steps of:

detecting congestion in the network by receiving a congestion notification frame with a BECN bit=1;

reducing a transmission window size on receipt of the first congestion notification frame;

starting a timer;

resetting a frame number counter and a congestion notification frame number counter;

determining whether a measurement interval has passed since starting said timer;

determining whether a frame is received when said measurement interval has not passed;

increasing said frame number counter incrementally when the frame is received;

determining whether the BECN bit of the received frame is set to 1;

increasing said congestion notification frame number counter incrementally when the BECN bit is set to 1;

calculating a ratio by dividing said congestion notification frame number counter by said frame number counter when said measurement interval has passed;

determining whether said ratio is positive;

reducing said transmission window size based on said ratio when the ratio is positive;

determining whether said transmission window size is set to the maximum transmission window size when the ratio is not positive; and enlarging said transmission window size when said transmission window size is not set to said maximum transmission window size.

2. A method according to claim 1, wherein, in the step of reducing a transmission window size on receipt of the first congestion notification frame, the transmission window size WS is altered according to WS=present WS×0.675 (where WS≧1).

3. A method according to claim 1, wherein, in the step of determining whether a measurement interval has passed since starting said timer, said measurement interval is set to twice a length of time from arrival of a normal frame at a remote terminal to reception of a response by a local terminal.

4. A method according to claim 1, wherein, in the step of reducing said transmission window size based on said ratio when the ratio is positive, the size is reduced to 0.5 of the present size when the ratio is equal to or more than 0.9, the size is reduced to 0.7 of the present size when the ratio R is under 0.9 and equal to or more than 0.6, the size is reduced to 0.8 of the present size when the ratio R is under 0.6 and equal to or more than 0.3, and the size is reduced to 0.9 of the present size when the ratio R is under 0.3 and more than zero.

5. A method according to claim 1, wherein, in the step of determining whether said transmission window size is set to the maximum transmission window size when the ratio is not positive, said maximum transmission window size is set to 32.

6. A computer readable medium containing program instructions for controlling congestion from a terminal in a frame relay network, the program instructions including instructions for performing the steps comprising:

detecting congestion in the network by receiving a congestion notification frame with a BECN bit=1;

reducing a transmission window size on receipt of the first congestion notification frame;

starting a timer;

resetting a frame number counter and a congestion notification frame number counter;

determining whether a measurement interval has passed since starting said timer;

determining whether a frame is received when said measurement interval has not passed;

increasing said frame number counter incrementally when the frame is received;

determining whether the BECN bit of the received frame is set to 1;

increasing said congestion notification frame number counter incrementally when the BECN bit is set to 1;

calculating a ratio by dividing said congestion notification frame number counter by said frame number counter when said measurement interval has passed;

determining whether said ratio is positive;

reducing said transmission window size based on said ratio when the ratio is positive;

determining whether said transmission window size is set to the maximum transmission window size when the ratio is not positive; and enlarging said transmission window size when said transmission window size is not set to said maximum transmission window size.

7. A computer readable medium according to claim 6, wherein, in the step of reducing a transmission window size on receipt of the first congestion notification frame, the transmission window size WS is altered according to WS=present WS×0.675 (where WS≧1).

8. A computer readable medium according to claim 6, wherein, in the step of determining whether a measurement interval has passed since starting said timer, said measurement interval is set to twice a length of time from arrival of a normal frame at a remote terminal to reception of a response by a local terminal.

9. A computer readable medium according to claim 6, wherein, in the step of reducing said transmission window size based on said ratio when the ratio is positive, the size is reduced to 0.5 of the present size when the ratio is equal to or more than 0.9, the size is reduced to 0.7 of the present size when the ratio R is under 0.9 and equal to or more than 0.6, the size is reduced to 0.8 of the present size when the ratio R is under 0.6 and equal to or more than 0.3, and the size is reduced to 0.9 of the present size when the ratio R is under 0.3 and more than zero.

10. A computer readable medium according to claim 6, wherein, in the step of determining whether said transmission window size is set to the maximum transmission window size when the ratio is not positive, said maximum transmission window size is set to 32.

* * * * *